(No Model.)
W. N. MORRISON.
DEVICE FOR COUPLING CARS.
No. 384,536. Patented June 12, 1888.
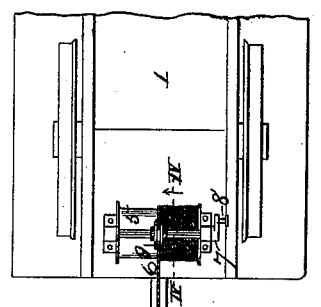
Fig. I.
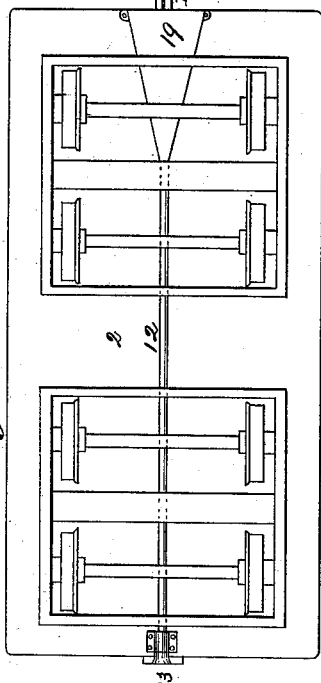
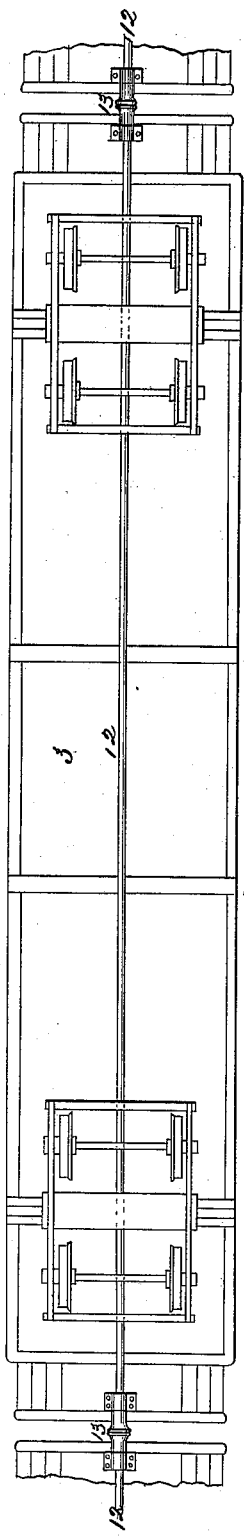
Fig. II.
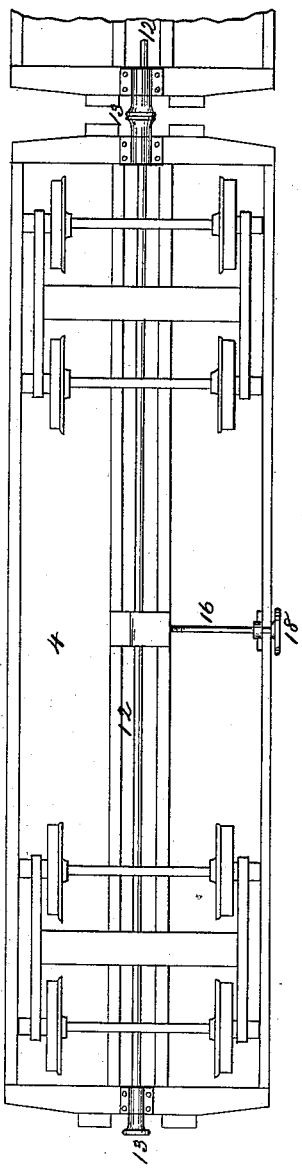
Fig. III.
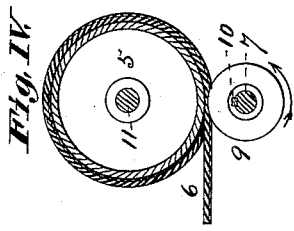
Fig. IV.
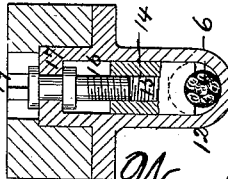
Fig. V.
Attest:
E. Arthur.
N. E. Burse,
Inventor:
Wm. N. Morrison
By Knight Bro
Attys

UNITED STATES PATENT OFFICE.

WILLIAM N. MORRISON, OF ST. LOUIS, MISSOURI.

DEVICE FOR COUPLING CARS.

SPECIFICATION forming part of Letters Patent No. 384,536, dated June 12, 1888.

Application filed February 3, 1888. Serial No. 262,920. (No model.)

*To all whom it may concern:*

Be it known that I, WILLIAM N. MORRISON, of the city of St. Louis, in the State of Missouri, have invented a certain new and useful Improvement in Devices for Coupling Cars, of which the following is a full, clear, and exact description, reference being had to the accompanying drawings, forming part of this specification.

This improvement consists in a cable which passes through tubes beneath the cars and means of gripping the cars to cable, and securing the cable to the locomotive or tender and to reel it up on the same or project it therefrom through the tubes on the cars.

Figure I is a bottom plan of a tender and part of a locomotive with my improvement applied thereto. Fig. II is a bottom plan of a passenger-car with my improvement. Fig. III is a bottom plan of a freight-car, showing the gripping device. Fig. IV is an enlarged detail section at IV IV, Fig. I. Fig. V is an enlarged detail section of the gripping device.

There is no change proposed in the general construction of the locomotive 1, tender 2, or railway-cars 3 or 4.

5 is a drum, which is shown supported in bearings beneath the locomotive, but which may be located anywhere upon the locomotive or tender. The drum is so constructed as to receive coiled upon it enough wire cable, 6, to reach the whole length of the train.

7 is a drive-shaft, which is rotated by any suitable engine on the locomotive or tender, the shaft being shown with a crank, 8, with which the pitman of the engine may be connected.

9 is a grooved pulley sliding freely upon the shaft 7 upon a spline, 10, which causes the pulley to turn with the shaft. The cable occupies the peripheral groove of the pulley, and is by the pulley pressed against the drum, so that as the pulley rotates the cable is coiled upon the drum or uncoiled therefrom.

The drive-shaft 7 and drum-shaft 11 may be connected together in such a manner as to have the same surface speed. This connection may be by cog or other positive gearing.

I have described this manner of supporting the cable on the locomotive or tender; but I wish it particularly understood that I do not confine myself to any particular apparatus for supporting or manipulating the cable. Beneath each car is a guide-tube, 12, having flaring ends 13. The tubes are to receive the cable, which extends from end to end of the train, and to which the cars are gripped in any suitable manner.

In passenger-cars, 3, the gripping device may very suitably be at one or both of the platforms, and the grip may be worked from above, while upon freight-cars, 4, the grip may be suitably worked from the side of the car. (See Fig. III.) The grip is shown with a grip-block, 14, which is forced against one side of the cable and forces it against the opposite side of the tube 12. The block 14 is shown with a screw-threaded socket, 15, to receive a screw-rod, 16, turning in bearings 17.

18 is a hand-wheel, by which the screw-rod is turned; or the screw-rod 16 may have a square or other prismatic end, 19, to receive a winch or key, by which it may be turned. (See Fig. V.) This form is suitable where the grip is worked from the platform or floor above.

In making up a train the cars would be placed in line and the cable projected through the tubes 12 throughout the whole length of the train and the grips of some or all of the cars applied to the cable. The cable would be paid out into the tube by the turning of the pulley 9 in the direction shown by the arrow in Fig. IV. The end of the cable passes through the wide mouth 19 of the tube and then through the main tubes 12. The degree of stiffness in the cable is such that it may be pushed through the whole length of the train by a device at its front end when it is confined within the tube 12. After the train has been coupled together the drum may be locked in position, or the cable may be gripped or held in any suitable manner at the locomotive or tender that will resist the drag of the train upon it.

I do not confine myself to any precise devices for handling or gripping the cable; but

What I claim as new is—

1. The combination, with a railway-car, of a tube extending from end to end of the car, and a draft-cable passing through and guided and protected by said tube, by which the cars are coupled together.

2. The combination, with a railway-car, of the tube 12 beneath the same, having flaring ends 13, for guiding the coupling-cable 6, substantially as and for the purpose set forth.

3. The combination, in a railway-train, of the cable-tubes beneath the cars, a cable secured to the locomotive and extending through the tubes, and gripping devices on the cars, for the purpose set forth.

4. The combination, in a cable, of a suitable device upon the locomotive or tender for winding and unwinding the cable, and guide-tubes and gripping devices upon the cars, substantially as and for the purpose set forth.

WM. N. MORRISON.

In presence of—
 SAML. KNIGHT,
 EDWD. S. KNIGHT.